Jan. 16, 1968         J. E. ROBERTSON         3,363,606
SINGLE-ROTOR TYPE INTERNAL COMBUSTION ENGINE
Filed Nov. 4, 1965         3 Sheets-Sheet 1
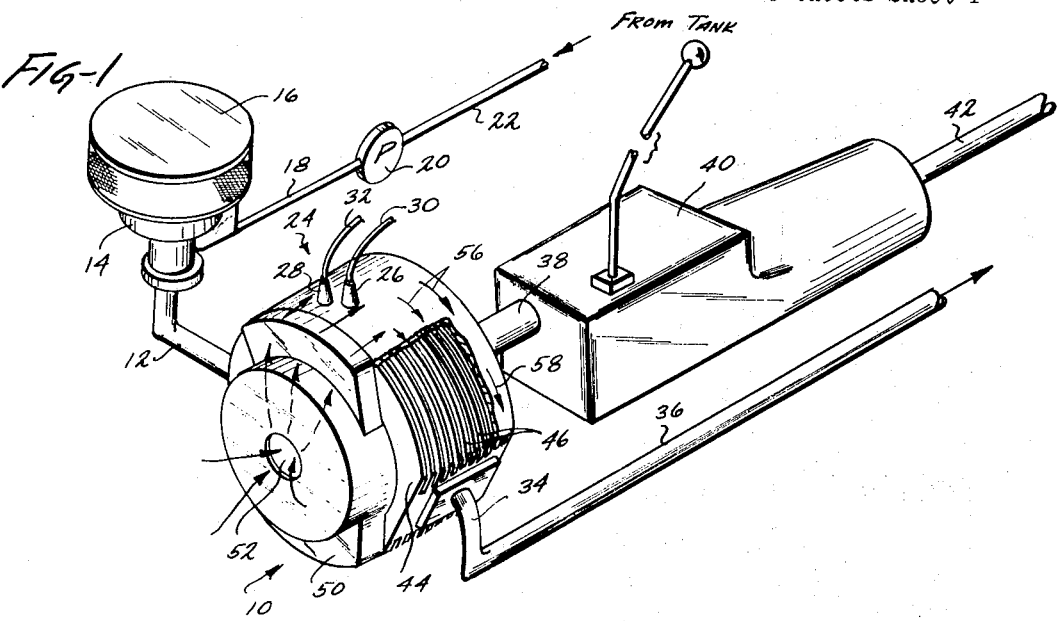
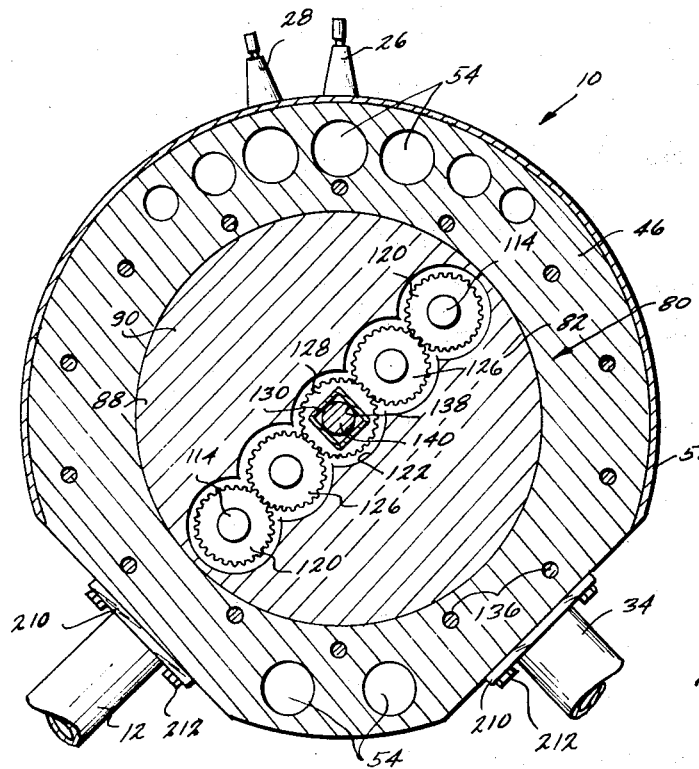
INVENTOR
JAMES E. ROBERTSON
BY Max E. Shirk
ATTORNEY Jan. 16, 1968  J. E. ROBERTSON  3,363,606
SINGLE-ROTOR TYPE INTERNAL COMBUSTION ENGINE
Filed Nov. 4, 1965  3 Sheets-Sheet 2

INVENTOR
JAMES E. ROBERTSON

BY Max E. Shirk
ATTORNEY

Jan. 16, 1968  J. E. ROBERTSON  3,363,606
SINGLE-ROTOR TYPE INTERNAL COMBUSTION ENGINE
Filed Nov. 4, 1965  3 Sheets-Sheet 3
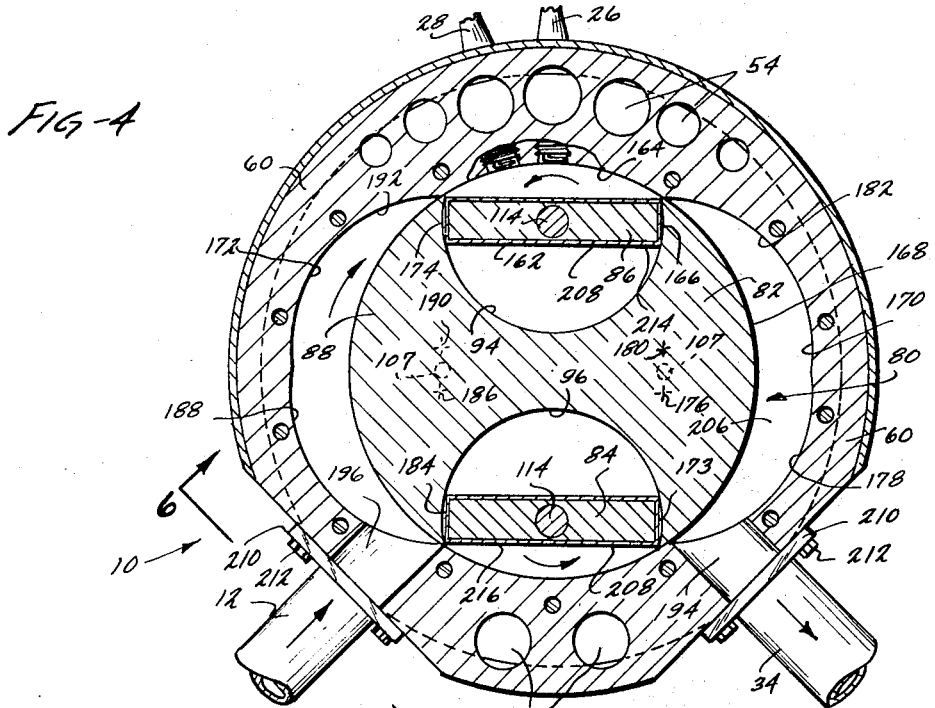
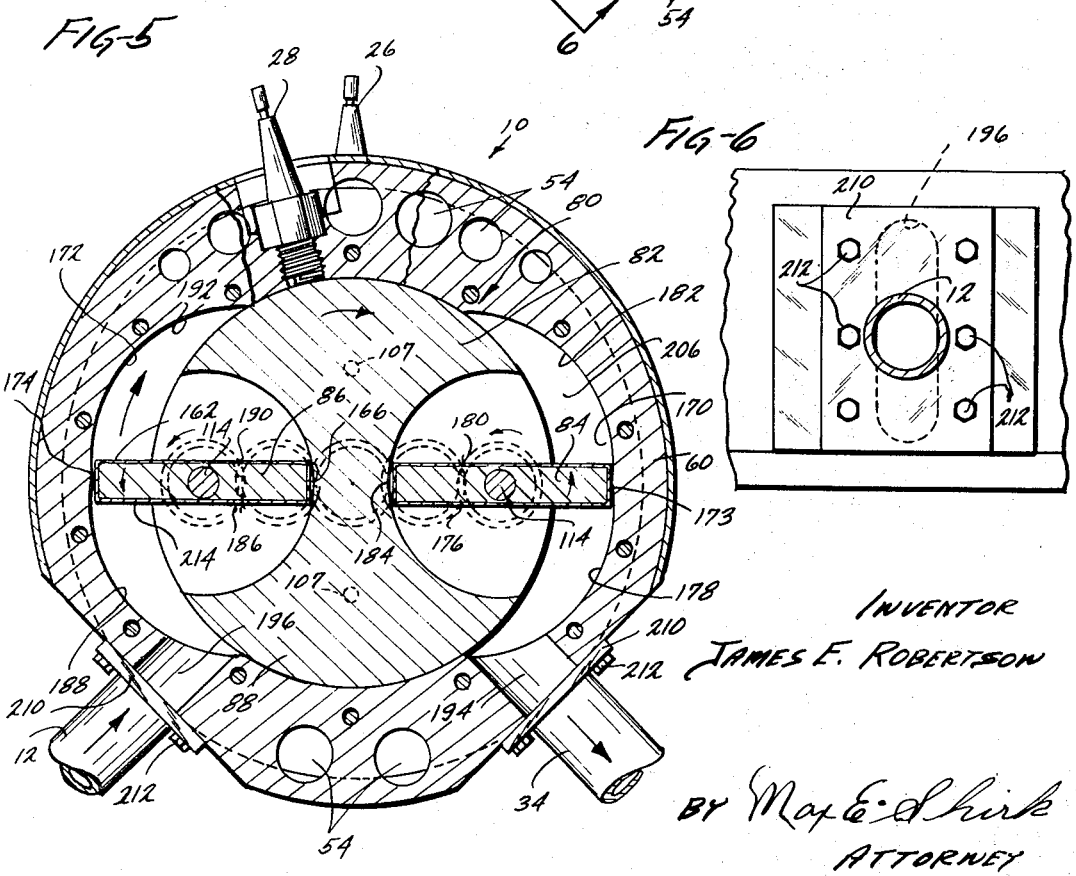
INVENTOR
JAMES E. ROBERTSON
BY Max E. Shirk
ATTORNEY

United States Patent Office 3,363,606
Patented Jan. 16, 1968

3,363,606
SINGLE-ROTOR TYPE INTERNAL
COMBUSTION ENGINE
James E. Robertson, 1756 Gates Ave.,
Manhattan Beach, Calif. 90266
Filed Nov. 4, 1965, Ser. No. 506,313
5 Claims. (Cl. 123—13)

ABSTRACT OF THE DISCLOSURE

A single-rotor type internal combustion engine includes a main rotor having two orbital rotors rotatably mounted thereon adjacent the peripheral edge thereof 180 degrees apart. Gearing maintains the orbital rotors horizontal as they are carried around by the main rotor which is recessed to accommodate the orbital rotors so that they are completely recessed at top-dead-center. The engine cylinder in which main rotor is rotatably mounted forms a compression and firing chamber with orbital rotors at top-dead-center. The orbital rotors then emerge from recesses in main rotor and sweep into intake and exhaust chambers formed by providing ellipticity in engine cylinder.

---

The present invention relates to a new and useful single-rotor type internal combustion engine and more particularly to such an engine employing a primary rotor having two secondary rotors rotatably mounted thereon for effecting two suction, compression, power and exhaust functions during each revolution of the primary rotor.

A number of different types of prior art rotary engines are known. One type is known as the "Moving Piston Type" which employs pistons and off-center crank shafts. While generally satisfactory, this type of rotary engine has the disadvantage that the engine has an off-balance condition.

Another type prior art rotary engine employs vanes which slide back and forth in a slot during rotation of a rotor in a non-circular cylinder. Such engines have the disadvantage that the reciprocating vanes result in loss of efficiency because the vanes must change speed as they come up into a short radius created by the off-center condition of the rotor with respect to the outer cylinder. Another disadvantage resides in the fact that the reciprocating vanes are subject to wear requiring periodic replacement and increased preventive maintenance costs.

Another type of prior art rotary engine operates on the principle of compressing and firing between gear teeth. While generally satisfactory, this type of rotary engine has the disadvantages of poor seating, low compression ratings and poor efficiency.

In view of the foregoing factors and conditions characteristic of rotary engines, it is a primary object of the present invention to provide a new and useful rotary engine not subject to the disadvantages enumerated above and having a new and useful rotor especially designed for operating the engine safely, efficiently and economically.

Another object of the present invention is to provide a new and useful internal combustion engine of the single-rotor type which employs a main rotor having secondary rotors rotatably mounted thereon.

Another object of the present invention is to provide a new and useful internal combustion engine of the type described which goes through two complete four cycle operations during each revolution of the rotor.

Another object of the invention is to provide an internal combustion engine of the type described which includes cylinder means having an internal, encompassing sidewall provided with a predetermined amount of ellipticity forming chamber means.

A still further object of the invention is to provide an internal combustion engine of the type described having a primary rotor rotatably mounted within a cylinder and secondary or orbital rotors rotatably mounted near the peripheral edge of the main rotor and geared to the main rotor in such a manner that the orbital rotors will remain in a substantially horizontal position during rotation of the primary rotor.

According to the present invention, a single-rotor type internal combustion engine is provided which includes a main rotor having two orbital rotors rotatably mounted adjacent a peripheral edge of the main rotor. The orbital rotors are mounted 180 degrees apart and extend beyond the periphery of the main rotor. The orbital rotors are connected to the main rotor through a gear train which maintains each orbital rotor in a substantially horizontal position at all times during rotation of the main rotor. The peripheral edge of the main motor is hollowed-out to accommodate the orbital rotors. With this arrangement, each orbital rotor is completely recessed within the main rotor at top-dead-center, whereby the cylinder which accommodates the main rotor forms a compression and firing chamber with the horizontally disposed orbital rotor at top-dead-center, the orbital rotor will emerge beyond the peripheral edge of the main rotor thereby requiring the cylinder to have a predetermined amount of ellipticity to accommodate the orbital rotor. This ellipticity forms a chamber of greater size than the chamber formed between the circular portion of the cylinder and the orbital rotor when the main rotor is at top-dead-center. Two such enlarged chambers are formed, one serving as an intake chamber and the other serving as an exhaust chamber.

With this arrangement, each orbital rotor has a leading edge and a trailing edge extending from the main rotor and remaining horizontal at all times during passage of a particular orbital rotor through the intake and exhaust chambers. In the intake chamber, the leading edge of a particular orbital rotor compresses a previously admitted fuel mixture while the trailing edge sweeps past the intake manifold to create a negative head drawing a fresh fuel mixture into the chamber. When the main rotor reaches top-dead-center, the compressed mixture is fired by a suitable spark plug or glow plug. The short time required for fuel ignition is sufficient for the main rotor to pass top-dead-center, whereby a lever arm is created between the horizontally disposed orbital rotor and the center of rotation of the main rotor so that the exploding force of the fuel is sufficient to drive the main rotor further past top-dead-center by pushing against the orbital rotor while the leading edge of the orbital rotor exhausts the products of combustion from a previous firing.

For each rotation of the main rotor, there are four distinct cycles of intake, compression, power and exhaust associated with each of the two orbital rotors. Thus, two distinct cycles of four cycle operation are accomplished for each rotation of the main rotor.

The enigne may be conveniently air cooled and is provided with a hood for directing air from a fan provided on the shaft which is connected to the main rotor. An output shaft is also connected to the main rotor for connecting the engine to a transmission in an automobile or the like.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

As used herein, the term "ellipticity" shall mean the extent of divergence of a path defined by the rotor means of the present invention from a true circle.

In the drawings:

FIGURE 1 is a perspective view showing somewhat schematically a new and useful internal combustion of the present invention in combination with a vehicle transmission system;

FIGURE 4 is a cross-sectional view taken along line 4—4 of FIGURE 2;

FIGURE 5 is a view similar to FIGURE 4 showing the main rotor and the orbital rotors in different operating positions than that shown in FIGURE 4;

FIGURE 6 is an enlarged, partial cross-sectional view taken along line 6—6 of FIGURE 4; and FIGURE 7 is a cross-sectional view taken along line 7—7 of FIGURE 2.

Figure 2:
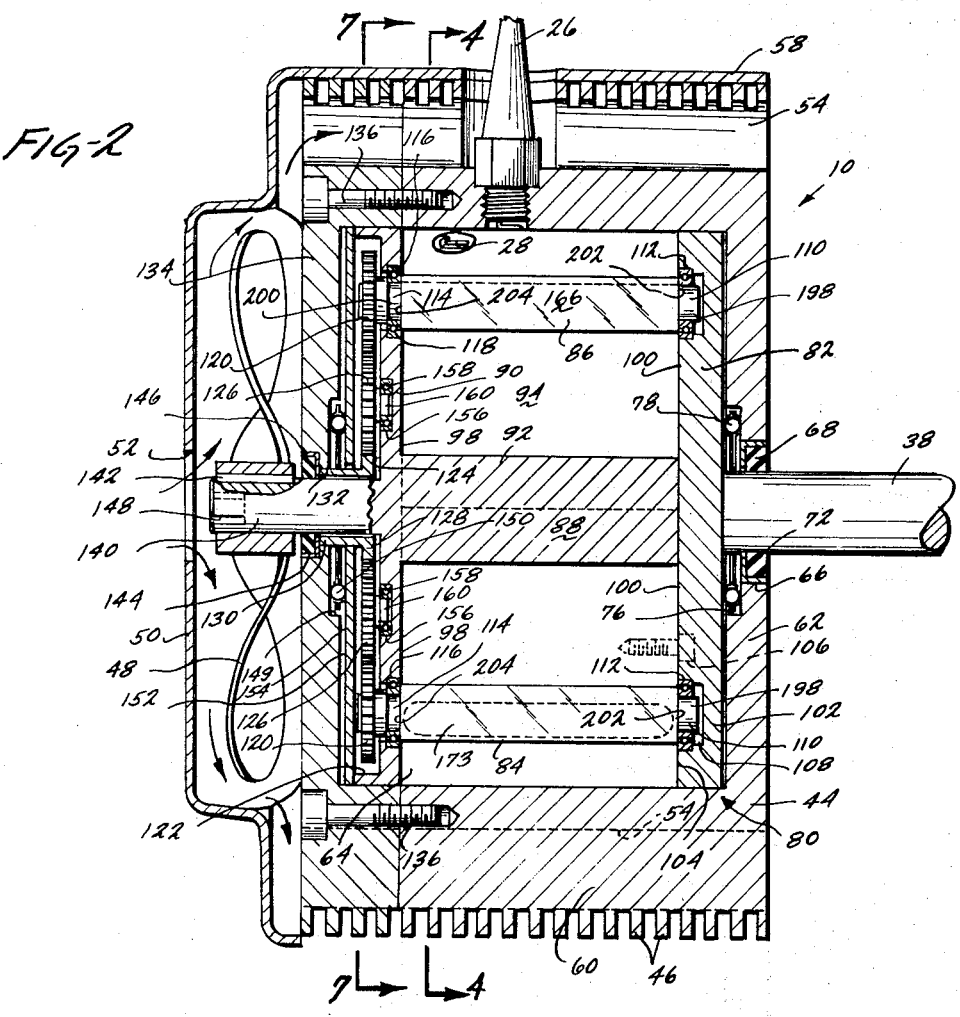
FIGURE 2 is an enlarged, cross-sectional view of the engine of FIGURE 1.

Referring again to the drawings, an internal combustion engine constituting a presently preferred embodiment of the invention, generally designated 10, includes an intake manifold 12 which receives a fuel-air mixture from a carburetor 14. The carburetor 14 receives air through an air inlet 16 and a suitable fuel, such as gasoline, through a conduit 18 which is connected to a pump 20 drawing fuel from a tank (not shown) through a conduit 22.

The fuel-air mixture received from a carburetor 14 is compressed within the engine 10 by means to be hereinafter described in detail and burned by a suitable fuel-ignition system 24 which may, if desired, include a starting plug 26 and a running plug 28. The plugs 26 and 28 may constitute conventional spark plugs, or, alternatively, they may comprise glow plugs, as shown, which may be connected to a suitable source of electrical current through electrical leads 30 and 32, respectively. After combustion, the products of combustion are exhausted, in a manner to be hereinafter described, through an exhaust manifold 34 from whence they flow through an outlet pipe 36 to atmosphere. Combustion within the engine 10 rotates an output shaft 38 in a manner to be hereinafter described which, for purposes of illustration but not of limitation, is shown as being connected to a transmission 40. The transmission 40 is connected to a drive shaft 42 which may comprise the conventional drive shaft of any suitable vehicle, not shown.

The engine 10 includes a block or cylinder 44 which is provided with cooling fins 46 about its periphery. Air is supplied to the fins 46 by a fan 48 (FIGURE 2) which is housed within a shroud 50 having an air inlet aperture 52. The fan 48 draws air into the shroud 50 through the aperture 52 and forces it through a plurality of apertures 54 which are provided in the block 44 and which extend into each fin 46. The air is forced circumerentially about the fins 46, as indicated by arrows 56, by an arcuate cover 58 which covers the fins 46.

The block or cylinder 44 includes an encompassing sidewall 60, a bottom wall portion 62 and an open top 64. The bottom wall 62 is provided with an aperture 66 receiving a seal 68 having a casing portion 70 which is shrunk fit in the aperture 66 and a sealing member 72 which seals the output shaft 38 of the engine 10 to the block 44. The bottom wall 62 is also provided with a counter bore forming a recessed portion 76 about the aperture 66. A thrust bearing 78 is seated in the recessed portion 76 which encompasses the shaft 38 and provides a bearing surface for a rotor means 80 which is rotatably mounted in the block 44.

The rotor means 80 includes a primary rotor 82 and a pair of secondary or orbital rotors 84, 86. The primary rotor 82 includes a body portion 88 having an integral front wall 90 and a central body portion 92 which may be formed by providing a cylindrical member with two counter bores forming somewhat semi-cylindrical cavities 94 and 96, respectively, in the body portion 88. The cavities 94 and 96 each have a front wall 98 formed by the rear surface of the front wall 90 and a rear wall 100 formed by the front surface of a plate 102 which may be secured to the rear face 104 of the body portion 88 by suitable cap screws, such as the one shown at 106 in FIGURE 2. The plate 102 forms the rear wall of the primary rotor 82 and carries the output shaft 38 which may be formed integrally therewith, if desired.

The plate 102 is provided with a pair of counter bores 108 in each of which one end 110 of an associated orbital rotor 84, 86 is rotatably mounted by a bearing 112. The other end 114 of each orbital rotor 84, 86 is rotatably mounted in a counter bore 116 which is provided in the wall 90 and which seats a bearing 118. Each end 114 has a gear 120 affixed thereto. A recess or gear channel 122 is formed in the front face 124 of the wall 90 to accommodate the gears 120 which are in driving engagement with an associated idling gear 126. The idling gears 126 are, in turn, in driving engagement with a common, central gear 128 which is non-rotatably mounted in the recess 122 by a square sleeve 130 engaging a square aperture 132 provided in a front plate 134 which may be secured to the block 44 by cap screws 136, as shown in FIGURE 2. The gear channel 122 is provided with a pair of counter bores 156 which receive bearing 158 for rotatably mounting an associated shaft 160 for each idling gear 126. A pair of centering pins 107 are provided on the body portion 82 for locating the plate 102 with respect to the face 104.

The square sleeve 130 includes a circular bore 138 which rotatably receives a shaft 140 formed integrally with the body portion 82 and to which the fan 48 is keyed by a suitable key 142. The shaft 140 extends through an aperture 144 provided in the front plate 134, is sealed by a suitable seal 146 and includes a crank slot 148 for receiving a crank, not shown, for starting the engine 10 in a manner to be hereinafter described. The plate 134 is provided with a counter bore 149 which receives a thrust bearing 150 forming a bearing surface for the front face 152 of a cover plate 154 which covers the recess or gear channel 122. During rotation of the rotor means 80, the orbital rotors 84 and 86 are maintained in a substantially horizontal position, as shown at FIGURES 4 and 5, by the gears 120, 126 and 128.

When the rotor means 80 is in the top-dead-center position shown in FIGURE 4, the orbital rotors 84 and 86 will be disposed completely within associated cavities 96 and 94 wherein the upper surface 164 of the encompassing sidewall 60 is subjacent the plugs 26 and 28. However, when the rotor means 80 is rotated in a clockwise direction past the FIGURE 4 position, the edge 166 of rotor 86 extends beyond the outer periphery 168 of the primary rotor 82. This extension or projection is accommodated within the encompassing sidewall 60 by providing it with a predetermined amount of ellipticity forming an exhaust chamber means 170 and intake chamber means 172. The amount of this ellipticity is determined by measuring one-half of the distance from the outer tip 173 of rotor 84 to the inner tip 174 of the orbital rotor 86 along the major axis of the rotor 84 and then moving upwardly along the minor axis to a point 180 forming the center for striking an arc 182 in the sidewall 60 thereby forming the chamber 170. The chamber 172 is formed by taking one half the distance from the outer edge 166 of the rotor 86 and inner edge 184 of the rotor 84 along the major axes of the rotors 84 and 86 and then moving down the minor axis of the rotor 86 to a point 186 establishing a center for striking an arc 188 and then moving up the minor axis to a point 190 forming a center for striking an arc 192. The volume of the intake chamber 172 is approximately fourteen times the volume of the compression chamber 164. Thus, the engine 10 has a compression ratio of approximately 14:1.

The exhaust chamber 170 and the intake chamber 172 are placed in fluid communication with their associated exhaust manifold 34 and intake manifold 12, respectively, by passageways 194 and 196, respectively.

Figure 3:
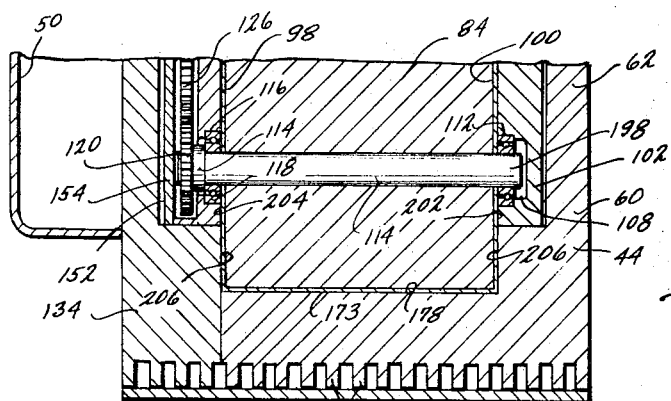
FIGURE 3 is an enlarged, partial cross-sectional view taken along line 3—3 of FIGURE 5.

The end 110 of each rotor 84 and 86 includes a shaft portion 198 which is seated in an associated bearing 112 and the end 114 of each rotor 84 and 86 includes a shaft portion 200 which is rotatably mounted in an associated bearing 118. The ends 110 and 114 also include portions 202 and 204, respectively, which are maintained in sealing relationship with the surface 100 on plate 102 and the surface 98 on wall 90 when the rotors 84 and 86 are in the position shown for the rotor 86 in FIGURE 4 so that the fuel will be compressed within the chamber 164. In addition, the edges 202 and 204 are maintained in sealing relationship with the rear wall 62 of the block 44 and the plate 134 during those portions of rotation of the rotor means 80 wherein the edges 166 and 173 extend beyond the peripheral edge 168. Since the thickness of the plate 102 and the plate 90 would prevent this, the bottom wall 62 and the front plate 134 are each provided with suitable lands, as indicated at 206 in FIGURE 3.

If desired, a graphite sleeve 208 may be placed around each of the rotors 84 and 86 to minimize the amount of lubrication required for the rotor means 80, to form an effective seal and to minimize the accuracy required for machining the various parts by virtue of the property of the graphite of wearing to accommodate to an irregular surface. The intake manifold 12 and the exhaust manifold 34 may be affixed to the engine 10 by plates 210 and bolts 212.

Operation of the engine will be readily understood. With the starting plug 26 arranged to fire from about top-dead-center to 5 degrees thereafter and the running plug 28 arranged to fire approximately 8 to 12 degrees before top-dead-center, fuel may be admitted to the intake manifold 12 by the carburetor 14. This fuel may comprise a suitable gasoline-air mixture with oil mixed therein for lubricating the engine 10. Alternatively, other types of fuel, such as diesel fuel, kerosene or the like, may be employed, as will be readily understood by those skilled in the art. The rotor means 80 may be rotated by applying a crank, not shown, to the crank slot 148 and rotating the rotor in a clockwise direction, as viewed in FIGURES 4 and 5. As the lower face 214 of rotor 86 passes the passageway 196, it creates a negative head in chamber 172 drawing fuel thereinto through the intake manifold 12. As the rotor means 80 continues its clockwise rotation, the following orbital rotor 84 compresses this fuel in the chamber 164 formed by the orbital rotor 84, the cavity 96 and casing 44. Just as the rotor 84 reaches its top-dead-center position, the compressed fuel mixture is fired by the starting plug 26. The expanding gas then drives the rotor 84 downwardly in the casing 44 to the exhaust chamber 170 so that the under surface 226 of the rotor 84 will exhaust the products of combustion from a previous firing through the passage 194. In the meantime, the rotor 86 has passed the intake passage 196 bringing in another charge of fuel while simultaneously compressing the fuel drawn in by rotor 84 into the chamber 164. When the rotor 86 reaches top-dead-center the starting plug again fires the fuel mixture imparting further angular velocity to the rotor means 80 moving the rotor blade 86 down to the exhaust chamber 170 where the under surface 214 of the rotor 86 drives the exhaust from the previous firing out the exhaust passageway 194. When the rotor means 80 reaches operating speed, the starting plug 26 may be disconnected from its electrical supply and the plug 28 energized to continue firing the combustible mixture in the compression chamber 164 each time the rotor means 80 reaches top-dead-center. It is apparent that the rotor means 80 will reach top-dead-center twice for each revolution so that two firings take place for each complete revolution.

While the particular internal combustion engine herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. An internal combustion engine, comprising:
    cylinder means having an internal, encompassing sidewall provided with a predetermined amount of ellipticity forming chamber means;
    fuel inlet means communicating with said chamber means for admitting a combustible fuel thereto;
    fuel outlet means communicating with said chamber means for exhausting combusted fuel therefrom;
    rotor means rotatably mounted in said cylinder means, said rotor means including a circular portion having an extended portion cyclically extending into said chamber means for drawing said combustible fuel into said chamber means through said inlet means and for exhausing said combusted fuel from said chamber means through said outlet means, said extending portion being recessed into said rotor means as said extending portion passes the circular portion of said cylinder for forming a combustion chamber with said circular portion, said circular portion comprising a cylindrical body portion having a somewhat semi-cylindrical cavity provided therein, said extending portion comprising a secondary rotor rotatably mounted in said cavity, said secondary rotor being mounted sufficiently close to the periphery of said body portion that said secondary rotor extends beyond said periphery when rotated to a predetermined position with respect to said body portion, said rotor means including gear means connecting said secondary rotor to said body portion in such a manner that said secondary rotor will remain in a substantially horizontal position during rotation of said body portion, whereby said secondary rotor will cyclically extend beyond said periphery and become recessed within said cavity during rotation of said body portion; and
    fuel ignition means mounted in said combustion chamber for burning fuel therein.

2. An internal combustion engine as stated in claim 1 wherein said chamber means is formed by providing said sidewall with a first predetermined amount of ellipticity for forming an intake chamber and a second predetermined amount of ellipicity forming an exhaust chamber 180 degrees from said intake chamber, said secondary rotor extending into said chambers when said secondary rotor is extended beyond said periphery.

3. An engine as stated in claim 1 including fan means and fin means for cooling said engine and an output shaft for connecting said engine to a work load.

4. A rotor as stated in claim 1 wherein said body portion is provided with a second semi-cylindrical cavity 180 degrees from said first cavity and includes a second secondary rotor rotatably mounted in said second cavity and second gear means for connecting said second secondary rotor to said body portion in such a manner that said second secondary rotor will remain in a substantially horizontal position during rotation of said body portion.

5. A rotor as stated in claim 4 wherein said secondary rotors are provided with graphite coverings for minimizing frictional contact with said cylinder means.

References Cited

UNITED STATES PATENTS 3,234,922  2/1966  Froede _____ 123—8

FOREIGN PATENTS 1,358,369  3/1964  France.

RALPH D. BLAKESLEE, *Primary Examiner.*